United States Patent
Julian et al.

(10) Patent No.: US 8,141,831 B2
(45) Date of Patent: Mar. 27, 2012

(54) HANGER CONNECTOR FOR FLEXIBLE TUBING

(75) Inventors: Frank D. Julian, Kansas City, MO (US); Truman J. Stegmaier, Lee's Summit, MO (US); Joseph P. Ismert, Kansas City, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 359 days.

(21) Appl. No.: 12/391,570

(22) Filed: Feb. 24, 2009

(65) Prior Publication Data

US 2010/0213326 A1 Aug. 26, 2010

(51) Int. Cl.
*A47B 96/00* (2006.01)
*F16L 3/08* (2006.01)
*F16L 3/12* (2006.01)

(52) U.S. Cl. .......... 248/220.21; 248/65; 248/74.1; 248/220.22

(58) Field of Classification Search .......... 248/220.21, 248/220.22, 229.2, 229.1, 226.11, 200, 65, 248/74.1, 49, 58; 52/219, 220.1, 712; 403/361; 174/44, 59; 4/252.2, 252.3, 695
See application file for complete search history.

(56) References Cited

U.S. PATENT DOCUMENTS

| | | | | |
|---|---|---|---|---|
| 2,719,047 A | * | 9/1955 | Bayes et al. | 403/361 |
| 3,009,167 A | * | 11/1961 | Leonard, Jr. | 4/695 |
| 4,842,548 A | * | 6/1989 | Bolante | 439/461 |
| 5,072,072 A | * | 12/1991 | Bawa et al. | 174/655 |
| D346,546 S | | 5/1994 | Tesmar, Jr. | |
| 5,794,897 A | * | 8/1998 | Jobin et al. | 248/74.4 |
| 6,352,224 B1 | * | 3/2002 | Collins | 248/73 |
| 6,435,568 B1 | * | 8/2002 | Fukano et al. | 285/331 |
| 6,467,734 B1 | | 10/2002 | Brown et al. | |
| 6,860,454 B1 | * | 3/2005 | Gronowicz, Jr. | 248/71 |
| 7,062,851 B2 | * | 6/2006 | Koessler | 29/857 |
| 7,484,698 B2 | * | 2/2009 | Budagher | 248/68.1 |
| 7,527,225 B1 | * | 5/2009 | Schulz et al. | 248/65 |
| 7,658,351 B2 | * | 2/2010 | Hansen | 248/74.3 |
| 2008/0191102 A1 | * | 8/2008 | Condon et al. | 248/67.7 |

OTHER PUBLICATIONS

Printout from website www.plumbersstock.com showing the Vanguard / Viega CLSE23 Turn-Out Clamp, believed to have been on sale for more than one year prior to the filing date of the present application.
Advertising materials of Sioux Chief Mfg. Co., Inc. showing the Strong Arm Bracketing System with Lock Block CTS Tube Clamps and Metal Bend Supports, on sale more than one year prior to the filing date of the present application.

* cited by examiner

*Primary Examiner* — Terrell McKinnon
*Assistant Examiner* — Chiedu Chibogu
(74) *Attorney, Agent, or Firm* — Erickson, Kernell, Derusseau & Kleypas, LLC.

(57) ABSTRACT

A connector for attaching a piece of flexible tubing to a pair of parallel brackets includes an arcuate bend support, front and rear clamping members, and at least one fastener interconnecting the front and rear clamping members. The clamping members are positioned on opposite sides of the brackets. The bend support includes a head rotatably received in a receiver in the rear clamping member. The head includes a collet sized to receive the tubing. A wedge is formed on the front clamping member in a position to engage the collet. As the fastener is tightened, the clamping members are drawn against the brackets and the wedge engages the collet to constrict the collet inwardly against the tubing.

21 Claims, 13 Drawing Sheets

# HANGER CONNECTOR FOR FLEXIBLE TUBING

BACKGROUND OF THE INVENTION

1. Field of the Invention

This invention relates to brackets or hangers for flexible tubing, and in particular to a connector adapted for use with a hanger system having a pair of flexible brackets which extend between building members (such as wall studs). The connector includes a mounting block which is selectively slidable along the brackets and a bend support which is rotatably connected to the mounting block.

2. Description of the Related Art

Stub-outs for faucets, showerheads, and the like are typically supported between wall studs by a plumbing strap. For example, U.S. Pat. No. 4,550,451 to Hubbard discloses a simple strap having pipe receiving openings spaced along its entire length. The strap is attachable to the outer edges of adjacent studs by inserting fasteners such as nails or screws through fastener openings located intermediate the pipe receiving openings. The pipe for the stub-out is typically soldered to the strap in order to fix it in position.

Plumbing straps of this type have several shortcomings. Firstly, the straps can be difficult to position in such a manner that the pipe is in the exact location desired. No matter how many pipe openings are provided, the position of the pipe is not universally adjustable. If the strap is fastened to the studs and no pipe opening is in the desired position, the bracket must be taken down and relocated. Even then, there is no guarantee that the pipe can be properly positioned. Also, soldering the pipes to the strap is labor intensive and can result in failure of the pipe. In order to allow pipes to be soldered to the brackets, prior art straps have been coated with copper oxide after fabrication, a process which produces a very thin layer of copper which can easily burn off during soldering, thereby exposing the steel and creating the potential for galvanic action with the pipes, which can cause leaks.

An improvement in pipe hanger systems is the Strong Arm™ bracketing system manufactured and sold by Sioux Chief Mfg. Co., Inc. of Peculiar, Mo. This system includes a pair of flexible brackets securable to the building members and a pipe connection member selectively slidable along the brackets. The pipe connection member can be slid into any desired position along the brackets and fastened in place. One version of the pipe connection member includes front and rear clamping members positioned on opposite sides of the brackets. Each of the clamping members including a respective pipe receiving opening sized to receive and support the pipe. The clamping members may be interconnected by at least one threaded fastener adapted for drawing said front and rear clamping members toward one another and against the brackets to fix the pipe connection member in position. A collet is formed integrally with one of the clamping members concentric with the respective pipe receiving opening. As the clamping members are drawn toward one another, the collet is compressed against the pipe to fasten it to the pipe connection member.

Flexible tubing, such as PEX (cross-linked polyethylene) tubing is being used in plumbing systems with increasing frequency. This type of tubing is easier to install than conventional rigid pipe since it can be routed around obstacles without adding elbows and the like to accomplish the bend. The tubing must be supported thorough tight bends, such as right angle bends, so that the tubing will not kink and cut off flow. Bend supports for supporting flexible tubing are well known; for example, a simple tube support is disclosed by U.S. Design Pat. No. D346,546 to Tesmar, Jr and sold by the Uponor Company of Apple Valley, Minn.

Another prior art bend support is the Vanguard Turn-Out Clamp sold by Vanguard Piping Systems Inc. of McPherson, Kans. The Vanguard Turn-Out Clamp includes an arcuate wall defining a radius of curvature and a pair of parallel side walls defining a passageway for flexible tubing. The Turn-Out Clamp also includes spacers that extend along an axis that is orthogonal to the radius of curvature. The spacers are of predetermined length and have ends configured to abut similarly shaped ends to allow adjacent brackets to be stacked with the spacers. The length of the spacers are selected to maintain the center lines of tubing held by the adjacent brackets to be at a predetermined distance.

The Strong Arm™ system is available with a pipe connection member adapted for use with flexible tubing. This system includes a metal bend support similar to that disclosed by Tesmar Jr. The bend support is fixedly mounted to a metal slider member which receives the Strong Arm™ brackets. The slider can be crimped to retain it in position relative to the brackets.

U.S. Pat. No. 6,467,734 to Brown et al. discloses a bracket for securing flexible tubing to a standard plumbing strap. The bracket comprises a bend support having a flange formed on a first end of the bend support. The flange is configured to engage edges of an opening in a plumbing strap during use of the bracket. The bend support includes curved inner and outer walls defining respective radii of curvature. Tubing can only be inserted into the bend support through a slot between the walls. The bracket also includes spacers similar to those of the Vanguard Turn-Out Clamp which allow it to be mounted directly to a wall stud as an alternative to using a plumbing strap.

A problem with all of the above brackets which are designed for use with flexible tubing is that the tubing is not positively securable to the brackets. This allows a stub-out to be pushed rearwardly into the wall where it cannot be retrieved. What is needed is a connector for flexible tubing which includes a bend support and a positive securing means for securing the tubing within the connector. Such a connector would preferably be adapted for use with an improved bracketing system, such as the Strong Arm™ system.

SUMMARY OF THE INVENTION

A connector for connecting a piece of flexible tubing to a pair of brackets, includes a mounting block and a bend support secured to the mounting block. The bend support comprises an arcuate body with first and second ends, a passageway formed along the body between the first and second ends and a head formed proximate the first end. The head includes a collet in alignment with the passageway. The passageway and the collet are sized to receive a piece of tubing.

The mounting block includes front and rear clamping members positionable on opposite sides of the brackets in abutting relationship with the brackets. The rear clamping member includes a support receiver for receiving the head of the bend support. The front clamping member includes a tubing receiver for passing the tubing therethrough and a wedge adjacent the tubing receiver. At least one fastener interconnects the front and rear clamping members and is adapted for drawing the front and rear clamping members toward one another and against the brackets to fix the position of the connector relative to the brackets. As the fastener draws the front and rear clamping members together with a piece of tubing extending through the collet and the tubing receiver, the wedge engages the collet to compress the collet against the tubing to fix the tubing relative to the connector.

DETAILED DESCRIPTION OF THE PREFERRED EMBODIMENTS

Figure 1:
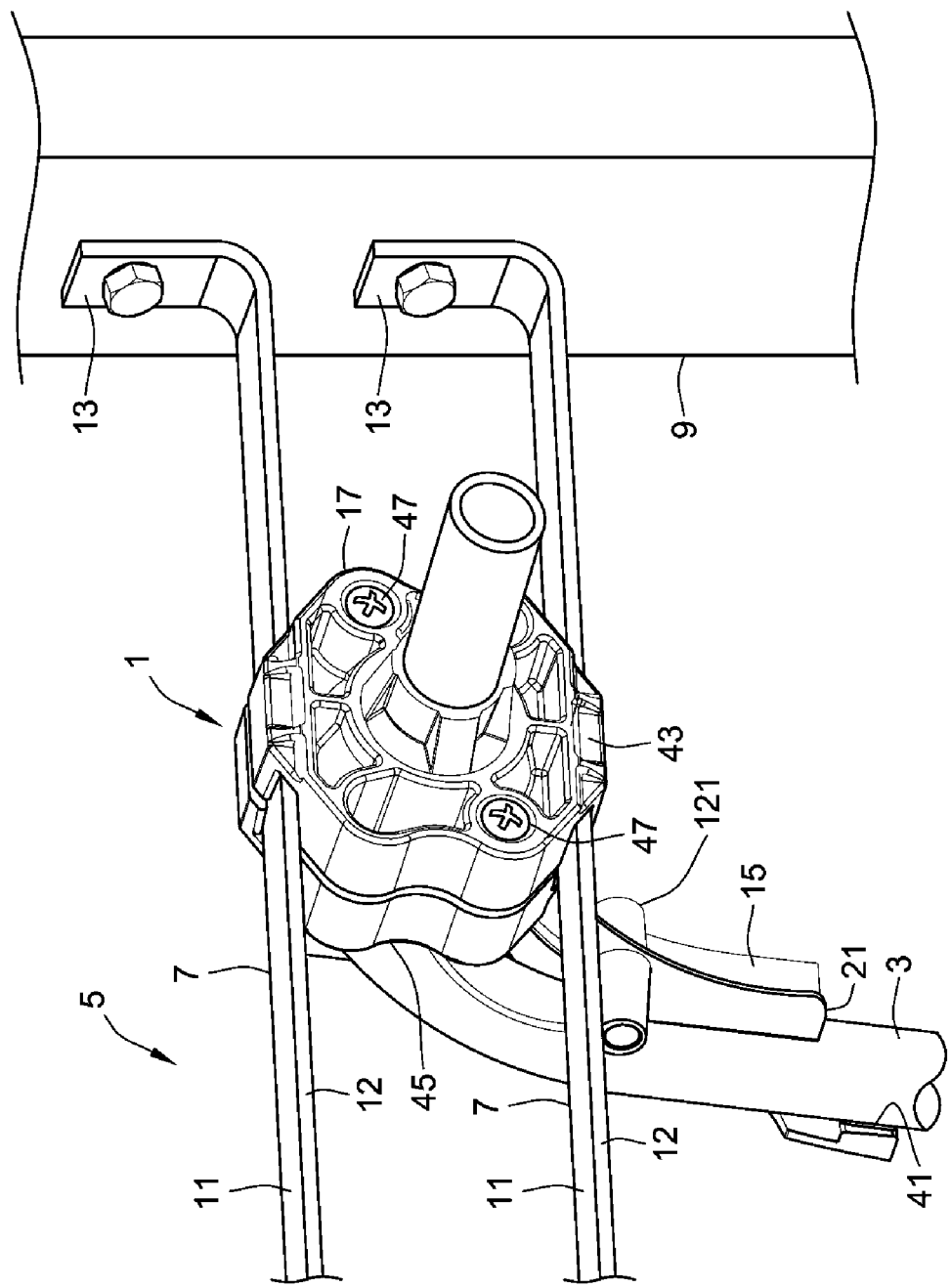
FIG. 1 is a fragmentary perspective view showing a hanger connector according to the present invention mounted on a pair of brackets between building members and supporting a piece of flexible tubing.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a hanger connector according to the present invention. The connector 1 is generally for use in supporting a piece of flexible tubing 3, such as PEX (cross-linked polyethylene) tubing. The connector 1 is used in combination with a pipe hanger system 5 which includes a pair of elongate brackets 7 which are adapted to be mounted between adjacent building members 9. A suitable pipe hanger system 5 is manufactured by Sioux Chief Mfg. Co., Inc. of Peculiar, Mo. and marketed as the Strong Arm™ system. The Strong Arm™ system is disclosed in U.S. patent application Ser. Nos. 11/557,883 and 12/102,259, the disclosures of which are incorporated herein by reference. The brackets 7 are formed of a rigid yet bendable material such as steel flat stock having a pair of opposed faces 11 and a pair of opposed edges 12, with the faces 11 being wider than the edges 12. The brackets 7 may either be face mount or inset mount, and include mounting tabs 13 which are fastened to the building members 9 using fasteners such as nails or screws.

The connector 1 generally includes an arcuate bend support 15 rotatably connected to a mounting block 17 which is selectively slidably mountable on the brackets 7. The bend support 15 is sized and shaped to receive the tubing 3 and support it through a ninety degree bend.

Figure 2:
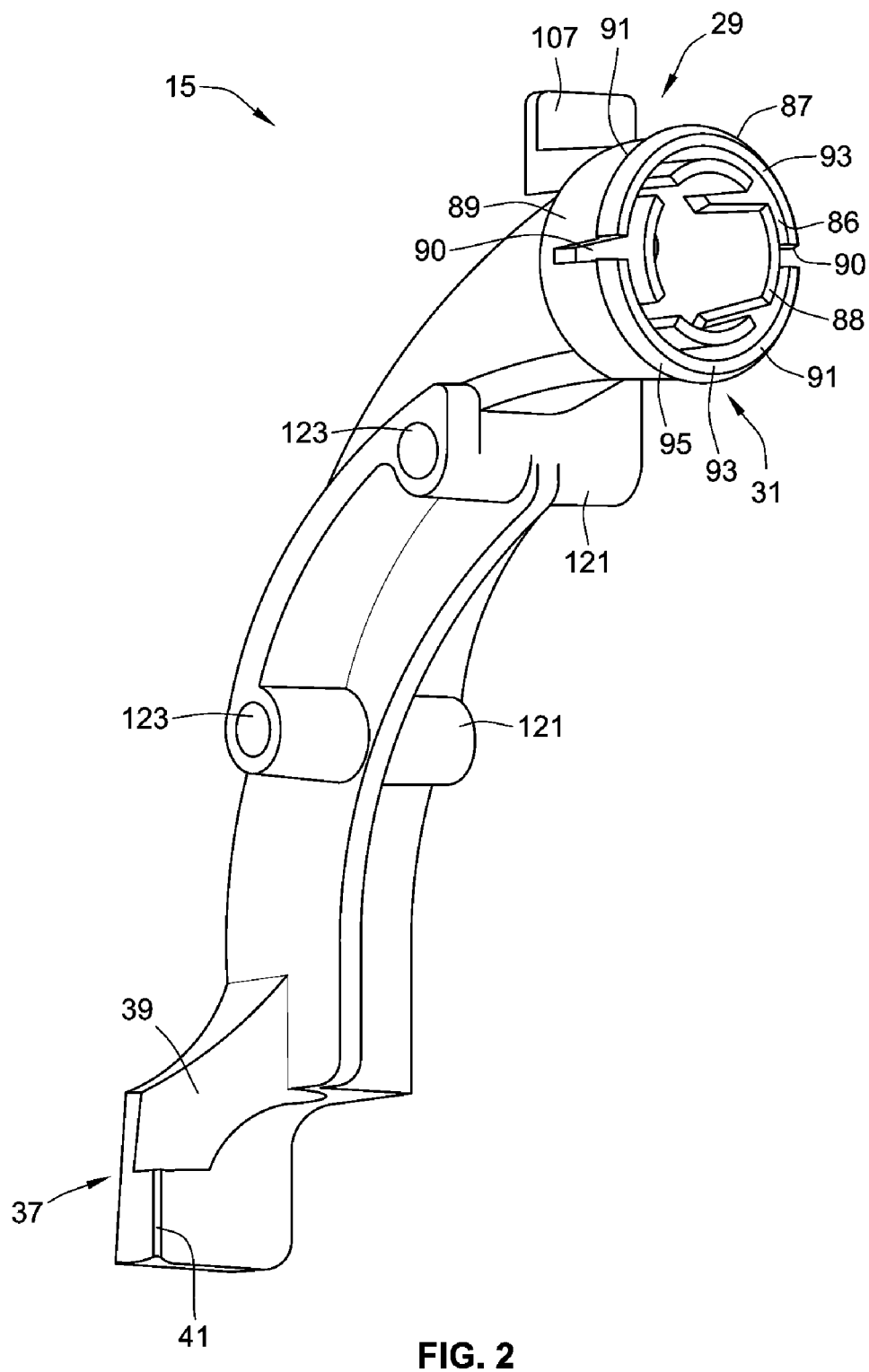
FIG. 2 is a perspective view of a bend support which forms a portion of the hanger connector.
Figure 3:
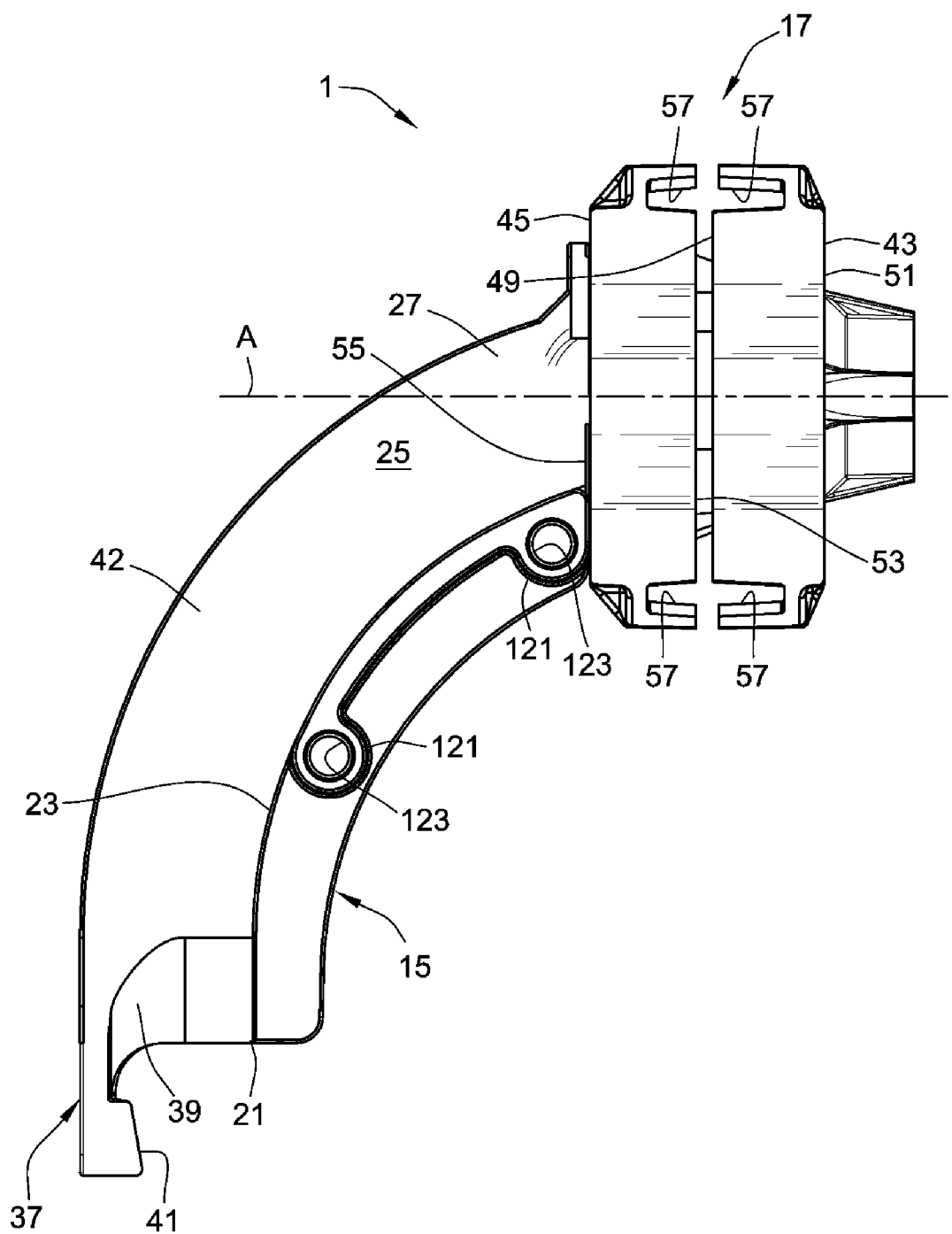
FIG. 3 is a side elevational view of the hanger connector.
Figure 4:
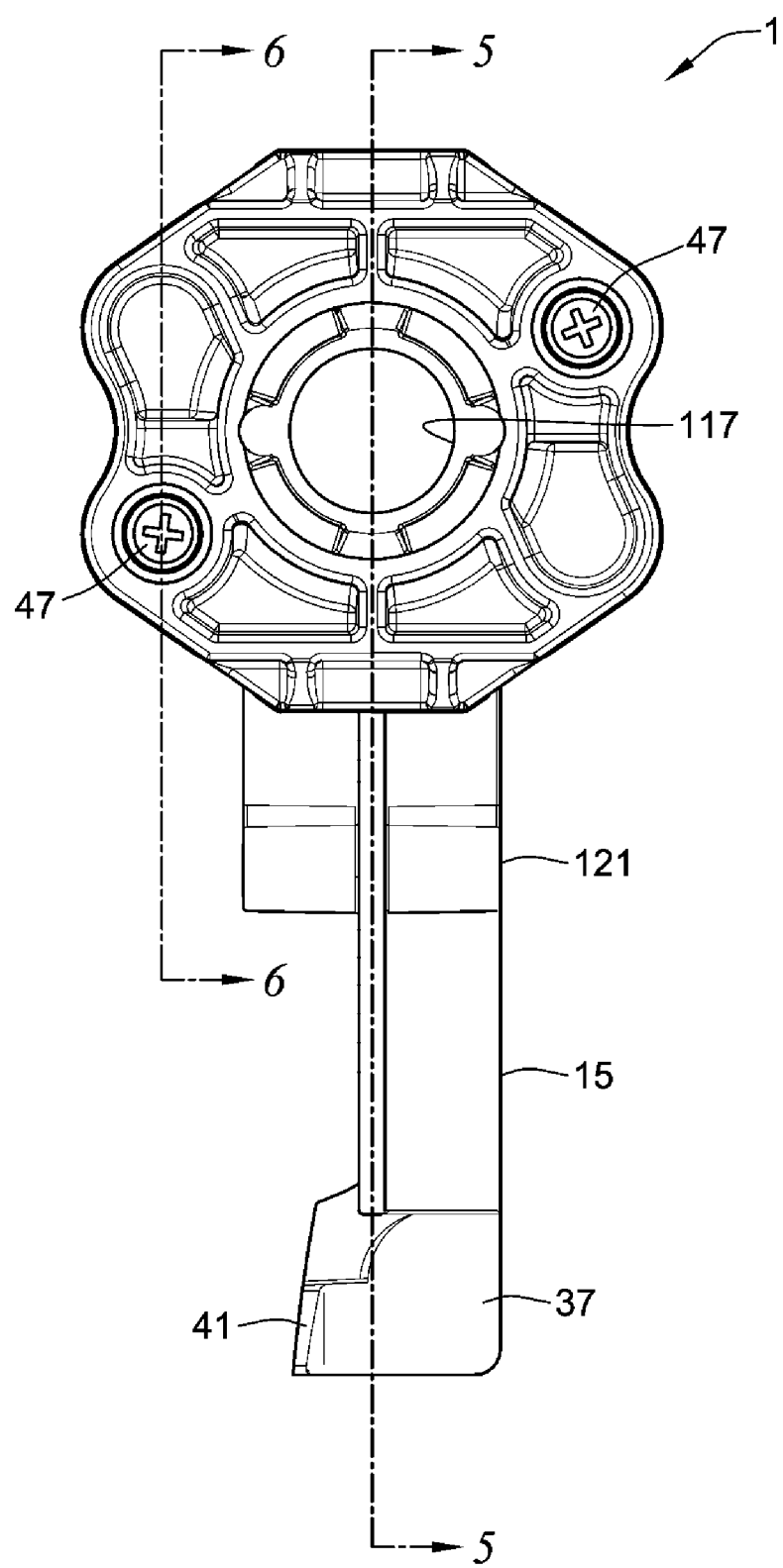
FIG. 4 is a front elevational view of the hanger connector.
Figure 5:
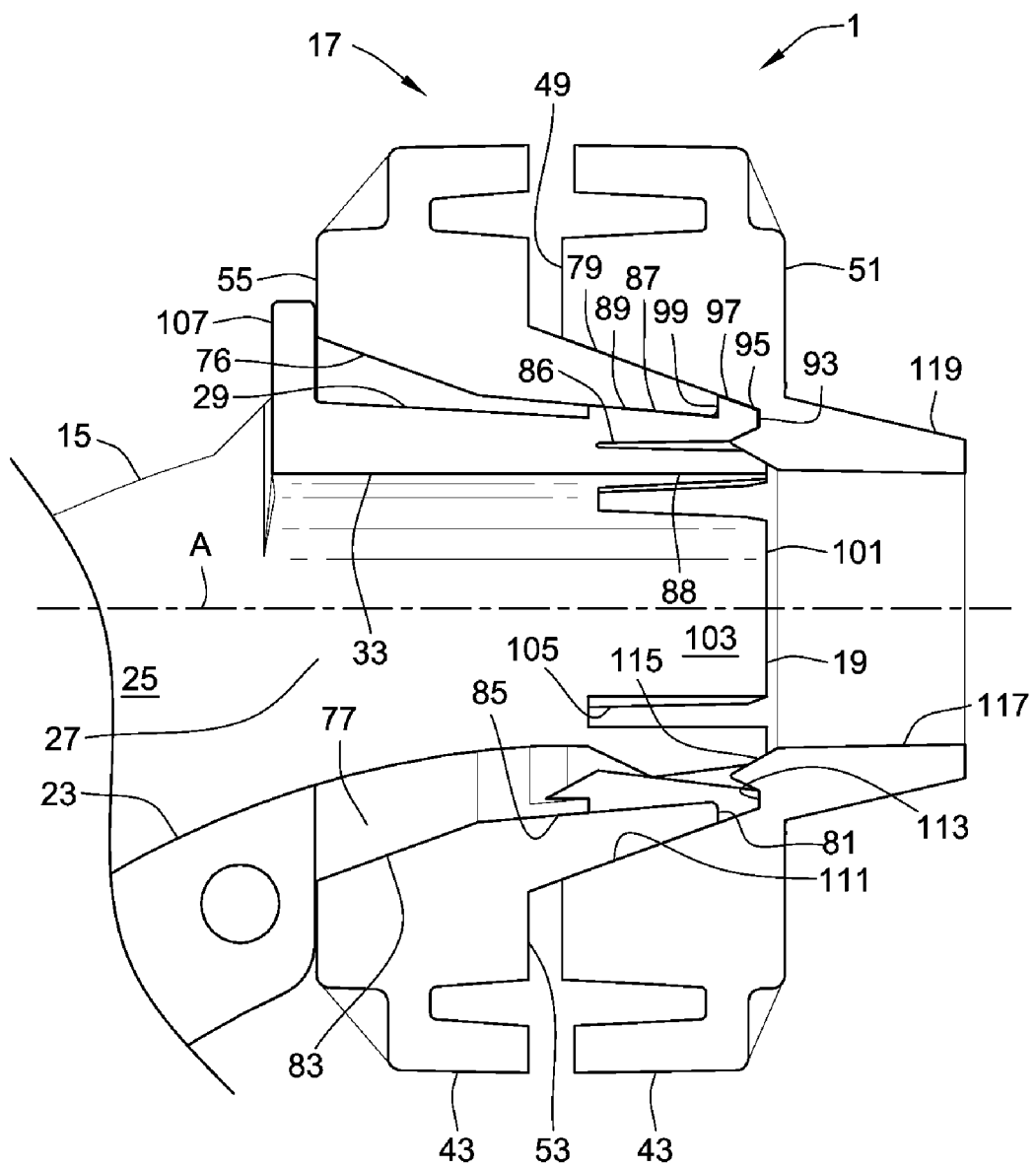
FIG. 5 is an enlarged, fragmentary cross-sectional view of the hanger connector taken generally along line 5-5 in FIG. 4.

Referring primarily to FIGS. 2, 3 and 5, the bend support 15 comprises an arcuate body having a first or forward end 19 (see FIG. 5) and a second or rearward end 21. The rearward end 21 is shown in the drawings as being oriented in a downward direction, however it is to be understood that the bend support 15 can be rotated about an axis A defined by the first end 19 such that the rearward end 21 may be oriented in any direction in a plane to which the axis A is normal, including upwardly, horizontally inward, or horizontally outward. For ease of description and consistency with the drawings, however, the connector 1 will generally be described herein as if the rearward end 21 of the bend support 15 were oriented downwardly.

The bend support 15 is preferably molded of a tough, durable plastic material, such as 30% glass-filled polypropylene, and includes a curved inner wall 23 and an upstanding side wall 25 which extend between the forward end 19 and rearward end 21 of the bend support 15 and partially defines a passageway or channel 27 for receiving the tubing 3. A forward portion of the bend support 15 proximate the first end 19 comprises a head 29 sized and shaped to be received in the mounting block 17. The head 29 includes a generally cylindrical enclosed portion 31 which encircles the passageway 27. A generally straight first outer wall section 33 extends rearwardly from the enclosed portion 31 in spaced relation to a corresponding forward portion of the inner wall 23.

The bend support 15 further includes a tail 37 which extends outwardly (downwardly in the drawings) from the rearward end 21 of the bends support 15. The tail 37 includes a generally straight second outer wall section 39 which extends outwardly in spaced relation to a corresponding rearward portion of the inner wall 23. The tail 37 further includes a barb 41 which extends inwardly from the second outer wall section 39. The inner wall 23, side wall 21, enclosed portion 31, first outer wall section 33, second outer wall section 39 and barb 41 all act in combination to securely retain the tubing 3 in the passageway 27.

The outer side of the bend support 1 is open between the rearward end of the first outer wall section 33 and the inner end (upper end in the drawings) of the second outer wall section 39. The space between the outer wall sections 33 and 39 may be designated as an opening 42. It should be noted that the presence of the opening 42 in the outer side of the bend support 15 is useful during installation of the tubing 3 as will be described below.

Referring to FIGS. 3 and 5, the mounting block 17 generally comprises a pair of clamping members including a front clamping member 43 and a rear clamping member 45 which are interconnected by at least one threaded fastener 47 (two fasteners 47 shown in FIG. 1). The clamping members 43 and 45 are preferably molded of a durable plastic, such as ABS (acrylonitrile butadiene styrene) or PVC (polyvinyl chloride).

The front clamping member 43 includes an inner face 49 and an outer face 51. Similarly, the rear clamping member 45 includes an inner face 53 and an outer face 55. The inner faces 49 and 53 of the clamping members 43 and 45 each have a pair of parallel grooves or channels 57 formed therein. The grooves 57 are sized to receive the edges 12 of the brackets 7.

Figure 6:
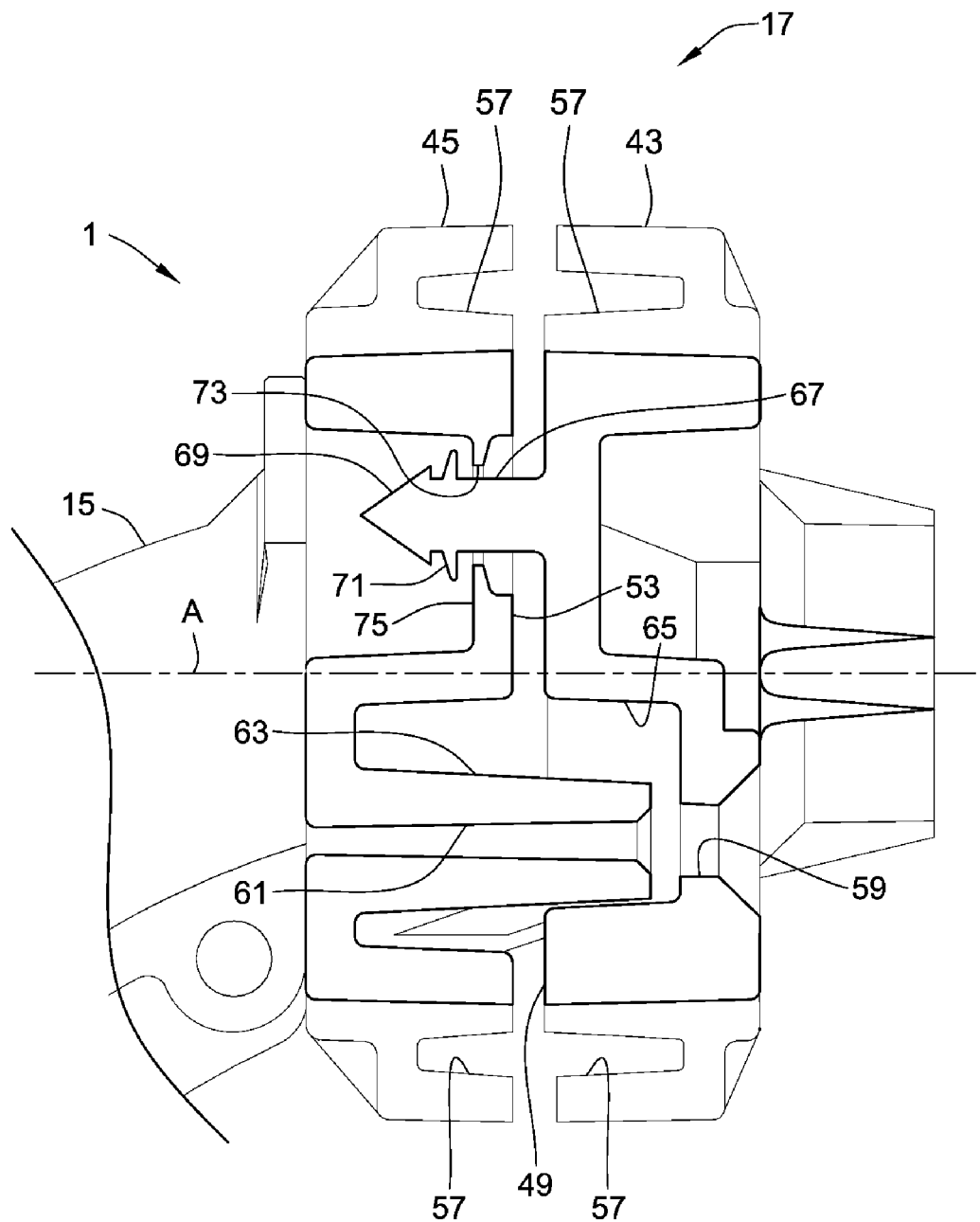
FIG. 6 is an enlarged, fragmentary cross-sectional view of the hanger connector taken generally along line 6-6 in FIG. 4.
Figure 7:
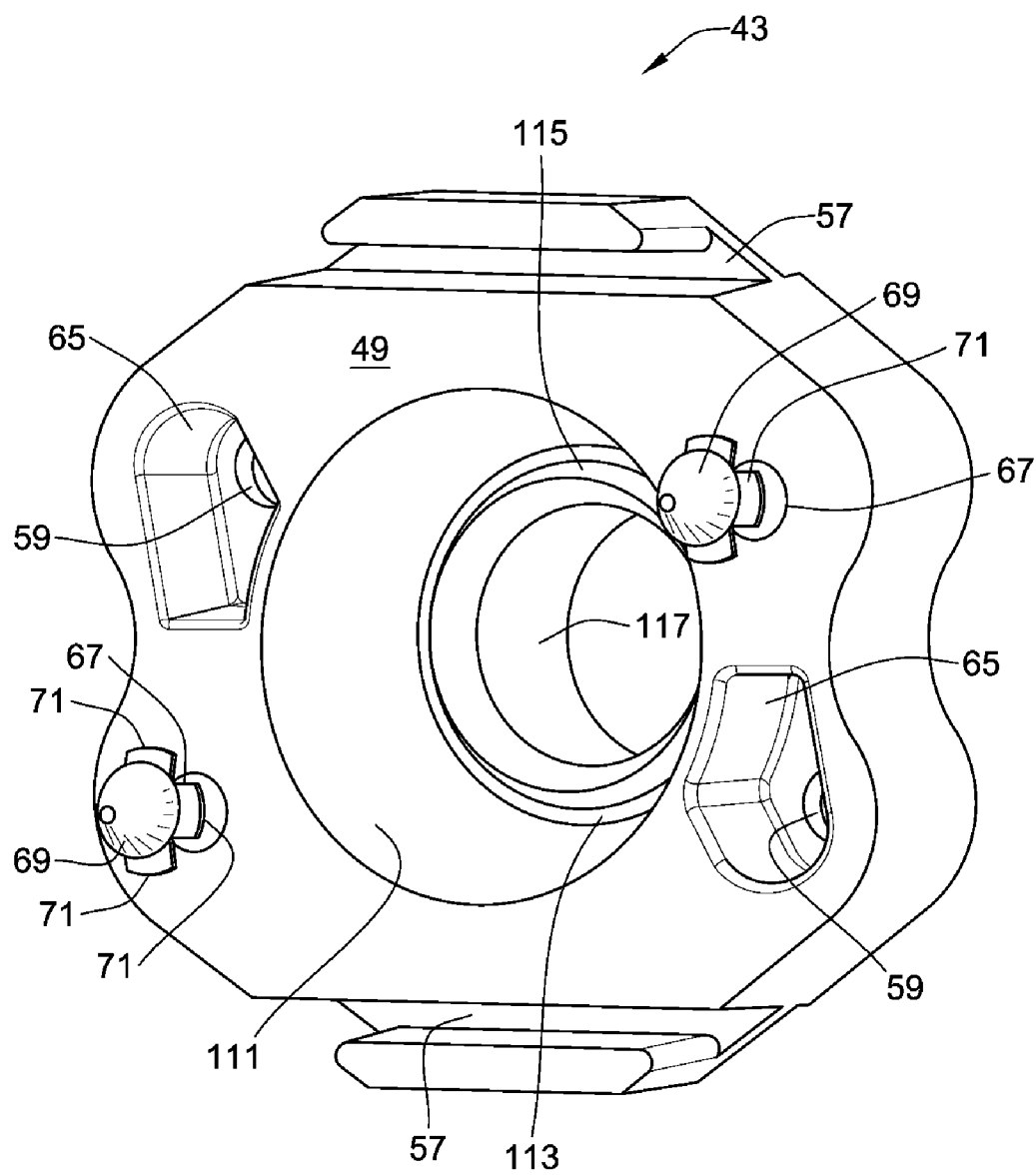
FIG. 7 is a perspective view of a front clamping member which forms a portion of the hanger connector.
Figure 8:
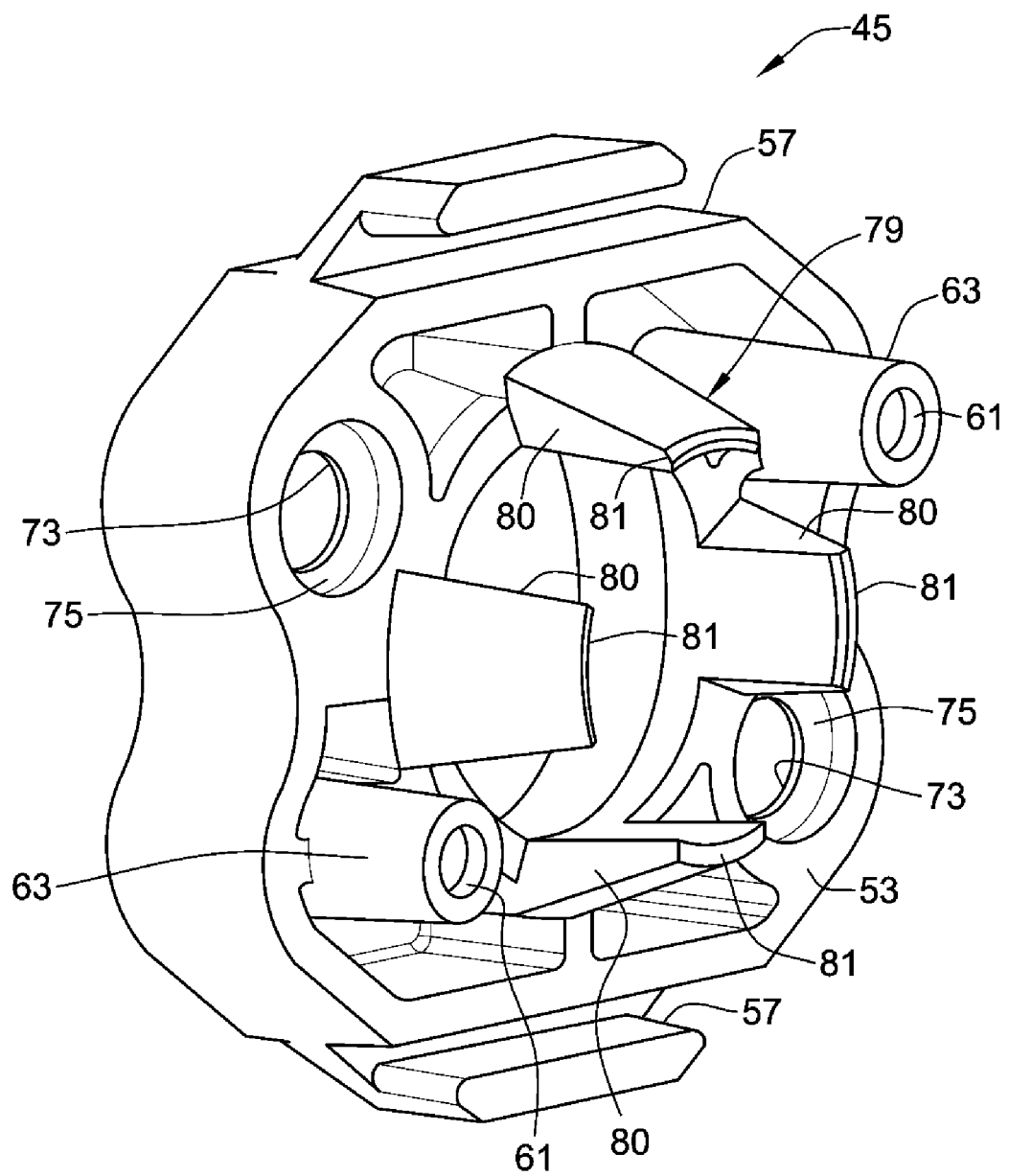
FIG. 8 is a perspective view of a rear clamping member which forms a portion of the hanger connector.
Figure 9:
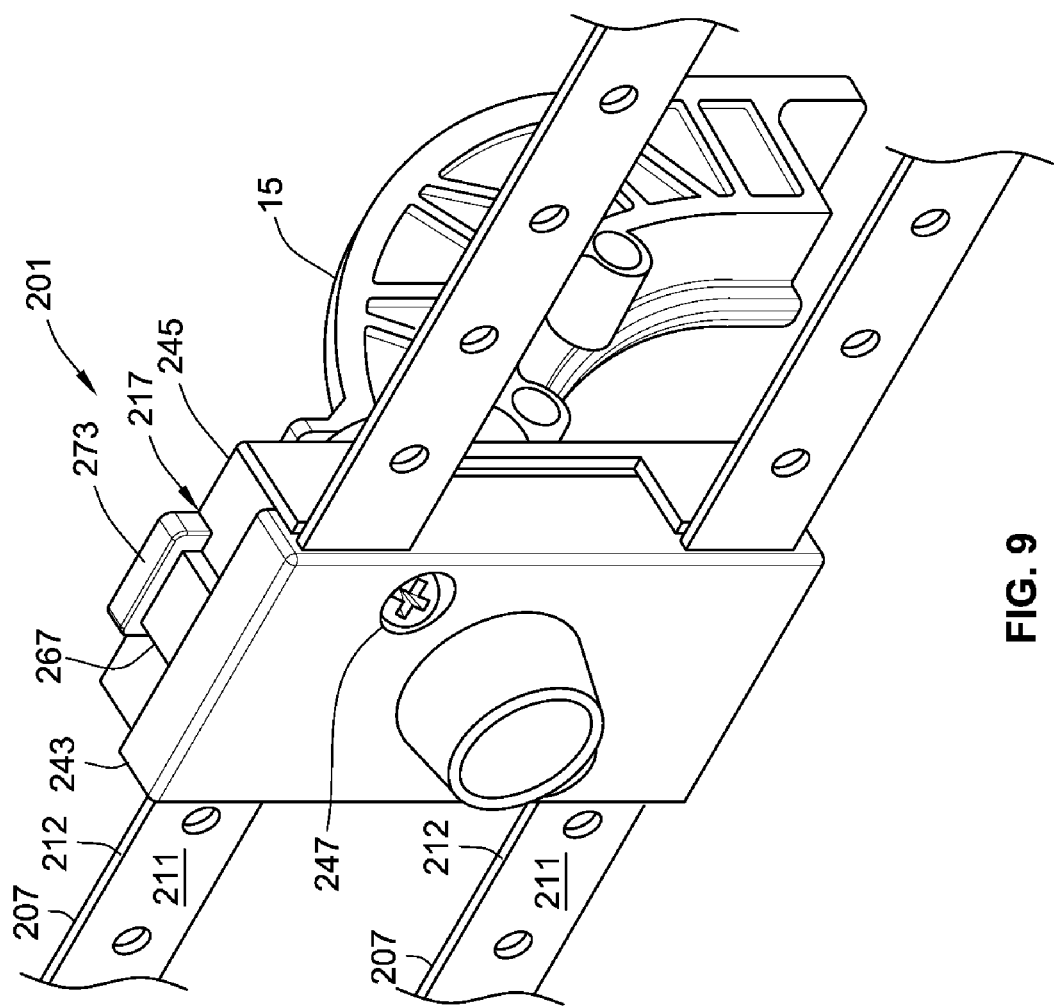
FIG. 9 is a perspective view of an alternative embodiment of the hanger connector mounted on a pair of brackets.
Figure 10:
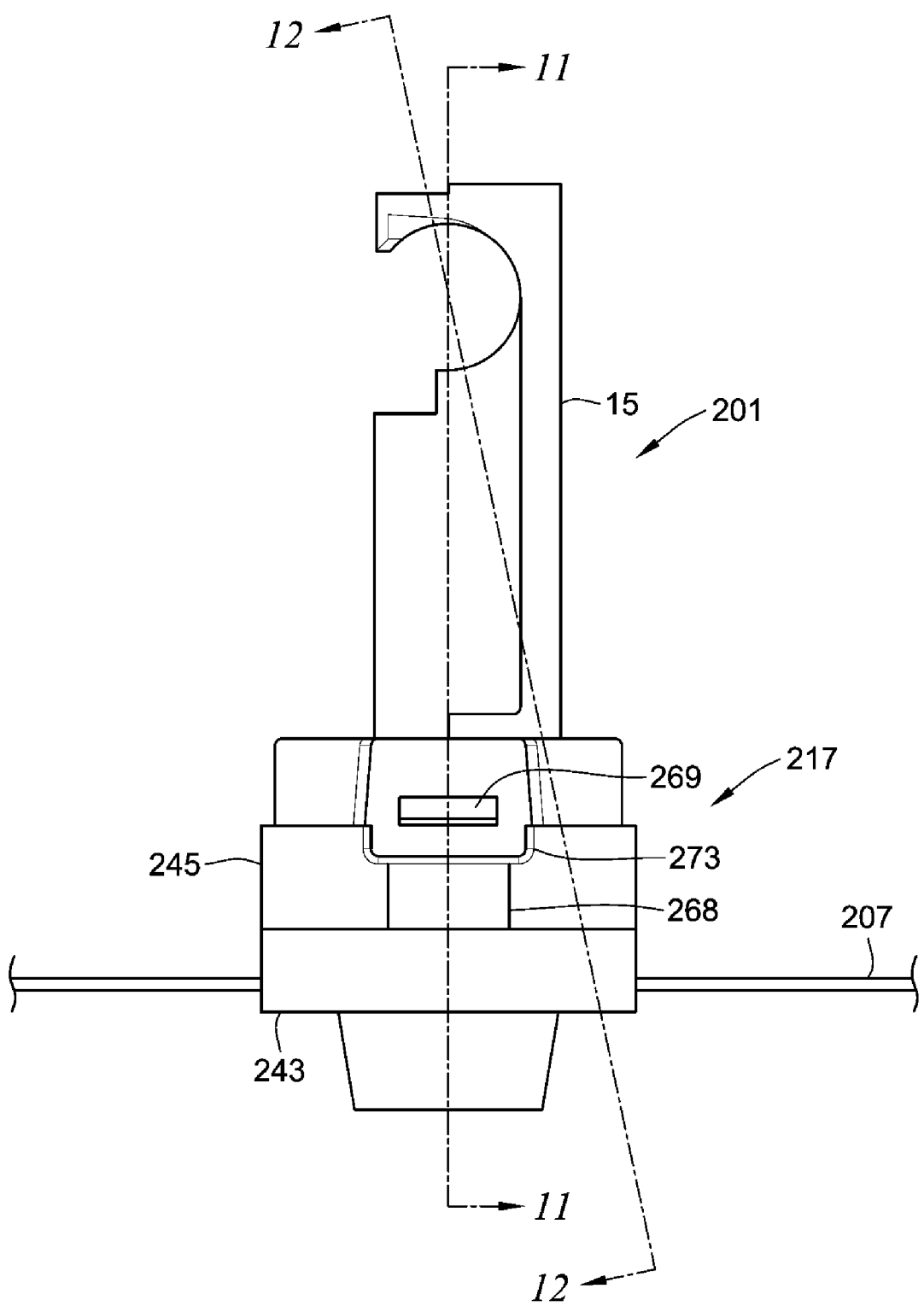
FIG. 10 is a top plan view of the alternative embodiment.

Referring to FIGS. 6-8, the threaded fasteners 47 each extend through a respective fastener opening 59 in the front clamping member 43 and threadably engage a respective fastener receiver 61 in the rear clamping member 45. The fastener openings 59 may be countersunk to receive flat-headed fasteners 47. The fastener receivers 61 are shown as being formed in respective cylindrical fastener bosses 63 which extend forwardly from the inner face 53 of the rear clamping member 45. The fastener bosses 63 are each received in a respective boss receiver 65 formed in the inner face 49 of the front clamping member 43 in alignment with the respective fastener opening 59.

As shown in FIG. 1, the brackets 7 are inserted between the clamping members 43 and 45 and in engagement with the grooves 57, such that the connector 1 is selectively slidably moveable along the brackets 7. When the fasteners 47 are loosely installed the connector 1 is freely movable along the brackets 7. When the fasteners 47 are tightened, the clamping members 43 and 45 are compressed against the brackets 7, thereby preventing the connector 1 from sliding relative to the brackets 7. It should be noted that the mounting block 17 preferably holds the two brackets 7 with the respective faces 11 thereof in a parallel relation to each other. This places the width of each bracket 7 (between the edges 12 thereof) in a horizontal orientation which gives the brackets 7 additional front-to-back rigidity.

The front clamping member 43 further includes a pair of retaining pins 67 which extend rearwardly from the inner face 49 thereof. The retaining pins 67 each include a conical head 69 and a plurality of radially outwardly extending flanges 71 positioned behind the respective head 69. The flanges 71 are flexible and extend outwardly beyond the widest part of the conical heads 69. The retaining pins 67 are received in pin receivers 73 formed through relatively thin wall portions 75 of the rear clamping member 45. As the pins 67 pass through the pin receivers 73, the flanges 71 are first bent rearwardly (away form the heads 69) and then spring back into place, thereby engaging the respective wall portions 75 around the pin receivers 73 on the back side of the rear clamping member 45 to resist separation of the front clamping member 43 from the rear clamping member 45, even before the fasteners 47 are installed. The lengths of the pins 67 are selected to allow sliding of the connector 1 along the brackets 7 until the fasteners 47 are installed and tightened.

Referring again to FIG. 5, the rear clamping member 45 further includes a support receiver 76 including a support receiving opening 77 sized to receive the head 29 of the bend support 15. Coaxial with the support receiving opening 77 is a generally frusto-conical nose 79 which extends forwardly from the inner face 53 of the rear clamping member 45. As best seen in FIG. 8, the nose 79 is divided into a plurality of nose sections 80 which taper inwardly as they extend away from the inner face 53. Each nose section 80 terminates in an arcuate end wall 81. Referring again to FIG. 5, the support receiving opening 77 includes a first portion 83 which extends into the rear clamping member 45 from the outer face 55 thereof and a second portion 85 which extends from the first portion 83 to the end walls 81 of the nose sections 80. The first portion 83 tapers inwardly from a larger diameter at the outer face 55 to a smaller diameter at its juncture with the second portion 85. The second portion 85 also tapers inwardly from the juncture with the first portion 83 to the annular end wall 81, but at a much more gradual angle. For example, the first portion 83 may taper inwardly at an angle of approximately twenty degrees, while the second portion 85 may only taper inwardly at an angle of approximately five degrees.

Referring to FIGS. 2 and 5, the enclosed portion 31 of the head 29 of the bend support 15 includes an annular groove 86 which extends into the head 29 from the first end 19 thereof to divide the enclosed portion into an outer wall 87 and an inner wall 88. The groove 86 has a V-shaped entrance opening such that outer wall 87 has a tapered inner edge and the inner wall 88 has a tapered outer edge. The inner wall 88 is slightly longer than the outer wall 87 and thus extends slightly further outward in the direction of axis A. The outer wall 87 has an outer surface 89 tapered to match the angle of the second portion 85 of the support receiving opening 77 in the rear clamping member 45, and includes two or more splits 90 dividing the outer wall 87 into two or more flexible wall portions 91. Each flexible wall portion 91 includes an arcuate tip 93 having at least one barb 95 formed thereon. Each barb 95 has an outer surface 97 and a rear surface 99. The outer surface 97 of each barb 95 tapers outwardly from the tip 93 to the respective rear surface 99. Each rear surface 99 lies approximately in a plane to which the axis A is normal.

The inner wall 88 of the head 29 of the bend support 15 forms a collet 101 positioned radially inward of the outer wall 87 and separated from the outer wall 87 by the annular groove 86. The collet 101 includes a plurality of fingers 103 separated by gaps or grooves 105.

The bend support 15 is attached to the rear clamping member 45 by pressing the head 29 of the bend support 15 into the support receiving opening 77 from the outer face 55. As the enclosed portion 31 of the head 29 is pressed into the opening 77, the outer surfaces 97 of the barbs 95 engage the tapered walls of the first portion 83 and the taper acts to compress the flexible wall portions 91 inwardly. Continued force applied to the bend support 15 urges the flexible wall portions 91 into the second portion 85 of the opening 77, further compressing the flexible wall portions 91. As the barbs 95 bear against the nose sections 80, the nose sections 80 may flex outwardly somewhat.

Once the barbs 95 pass the end walls 81 of the nose sections 80, the flexible wall portions 91 spring outwardly such that the rear surfaces 99 of the barbs 95 will catch on the end walls 81 to prevent the head 29 from being withdrawn from the support receiving opening 77. The bend support 15 further includes an outwardly extending stop 107 which engages the outer face 55 of the rear clamping member 45 to prevent the head 29 from being pushed completely through the support receiving opening 77.

The inner face 53 of the front clamping member 43 includes a tapered nose receiver 111 sized and shaped to receive the nose 79 of the rear clamping member 45. The tapered nose receiver 111 terminates in an annular wall 113. Extending rearwardly from the annular wall 113 is an annular wedge 115. The wedge 115 is spaced radially inwardly from the wall of the nose receiver 111 and positioned to engage the annular groove 86 in the head 29 of the bend support 15. A tubing receiver 117 extends through the front clamping member 43 radially inward of the annular wedge 113. An outwardly extending collar 119 is formed on the outer face 51 of the front clamping member 43 in alignment with the tubing receiver 117. The collar 119 helps keep the tubing 3 straight as it extend through the tubing receiver 117.

It should be noted that the bend support 15 can be used separately, without the mounting block 17 or brackets 7, to fasten a tube 3 to a building member 9 and support the tube 3 through a ninety degree bend. To this end, the bend support 15 includes a pair of mounting bosses 121 formed on the inner wall 23 thereof, outside of the passageway 27. Each mounting boss 121 includes a respective fastener receiving aperture 123 adapted to receive a fastener (not shown), such as a nail or screw, which can be used to fasten the bends support 15 directly to a building member. The bosses 121 are of a length selected to extend substantially across the thickness of the bend support 15.

In use, the bend support 15 is installed in the rear clamping member 45 by pushing the head 29 of the bend support 15 into the support receiving opening 77 of the rear clamping member 45 until the barbs 95 of the head 29 snap over the end walls 81 of the nose sections 80 of the rear clamping member 45. The connector 1 can then be installed on the two brackets 7 by positioning the edges 12 of the brackets 7 between the grooves 57 of the front clamping member 43 and the corresponding grooves 57 on the rear clamping member 45, and pressing the retaining pins 67 of the front clamping member 43 into the respective pin receivers 73 of the rear clamping member 45 to assemble the mounting block 17. As the front clamping member 43 and rear clamping member 45 are brought together, the nose 79 of the rear clamping member 45 is received in the nose receiver 111 of the front clamping member 43 and the fastener bosses 63 are received in the boss receivers 65. Once the fingers 71 of the pins 67 snap past the wall 75, the connector 1 will be slidably mounted on the brackets 7. The bend support 15 remains rotatable relative to the mounting block 17. The fasteners 47 can be loosely installed at this point, or left out until later since the retaining pins 67 will hold the connector 1 together. The preceding assembly steps may all be performed by the manufacturer of the connector 1 which may then be supplied to contractors pre-installed on the brackets 7.

The brackets 7 can then be mounted to the building members 9 in a manner prescribed by their manufacturer and the connector 1 slid into its approximate desired position. Once the brackets 7 are mounted, the tubing 3 can be installed in the connector 1. The tubing 3 is initially slid directly into the head 69 of the bend support 15 from the back side thereof, through the opening 42 in the outer side of the bend support 15, until the tubing 3 extends through the head 69, and outwardly through the tubing receiver 117 in the front clamping member 43. Once the needed length of tubing 3 extends out of the tubing receiver 117, the tubing 3 can be bent downwardly into the passageway 27 and hooked under the barb 41 on the tail 37 of the bend support 15. The tubing 3 is thus positioned in the passageway 27 without having to thread the tubing 3 through the entire length of the bend support 15.

Once the tubing 3 is installed, the connector 1 is adjusted into its final position along the brackets 7. The connector 1 is then fixed to both the brackets 7 and the tubing 3 by installing and tightening the fasteners 47. As the fasteners 47 are tightened, the clamping members 43 and 45 are drawn against the brackets 7, thereby clamping the brackets 7 between the clamping members 43 and 45 and fixing the position of the connector 1 along the brackets 7. Simultaneously, the annular wedge 115 is forced into the annular groove 86 between the collet 101 and the outer wall 87 of the head 29 of the bend support 15. The action of the wedge 15 forces the fingers 103 of the collet 101 inwardly, thereby clamping against the tubing 3 and axially fixing the tubing 3 to the bend support 15. The action of the wedge 115 also forces the flexible wall portions 91 of the outer wall 87 outwardly against the nose sections 80, thereby fixing the bend support 15 to the mounting block 17 and preventing or resisting further rotation of the bend support 15 relative to the mounting block 17. The tapered nose receiver 111 of the front clamping member 43 engages the outer surfaces of the nose sections 80 and prevents them from flexing outwardly. The rotational fixing of the bend support 15 is further accomplished by the barbs 95 on the outer wall 87 being clamped between the end walls 81 of the nose sections 80 of the rear clamping member 45 and the annular wall 113 of the front clamping member 43.

Alternative Embodiment

An alternative embodiment of the connector 1, denominated herein as connector 201 is shown in FIGS. 9-13. The connector 201 is similar to the connector 1, except that it includes a mounting block 217 which is adapted to receive a pair of brackets 207 in an orientation wherein the brackets lie generally in the same plane. The connector 201 is designed for use in close clearance installations where there is insufficient room to mount brackets 7 in parallel planes, such as when a stud bay already has a 2 inch vent pipe installed herein. The mounting block 217 includes front and rear clamping members 243 and 245, respectively, and is used with a bend support 15 as described above. The brackets 207 may be simple flat steel straps of the type referred to in the industry as "Hyco straps." Each bracket 207 has a pair of opposed faces 211 and a pair of opposed edges 212.

The front clamping member 243 includes an inner face 249 and an outer face 251. Similarly, the rear clamping member 245 includes an inner face 253 and an outer face 255. The inner face 249 of the front clamping member 243 has pair of parallel grooves or channels 257 formed therein. The grooves 257 are sized to receive the faces 211 of the brackets 207. The rear clamping member 245 includes a pair of abutments 258 which extend forwardly from the inner face 253 in alignment with the grooves 257 and are sized to be received within the grooves 257. Each abutment 258 includes a forward face 259. The brackets 207 are received in the grooves 257 and captured therein between the front clamping member 243 and the forward faces 259 of the abutments 258.

Figure 12:
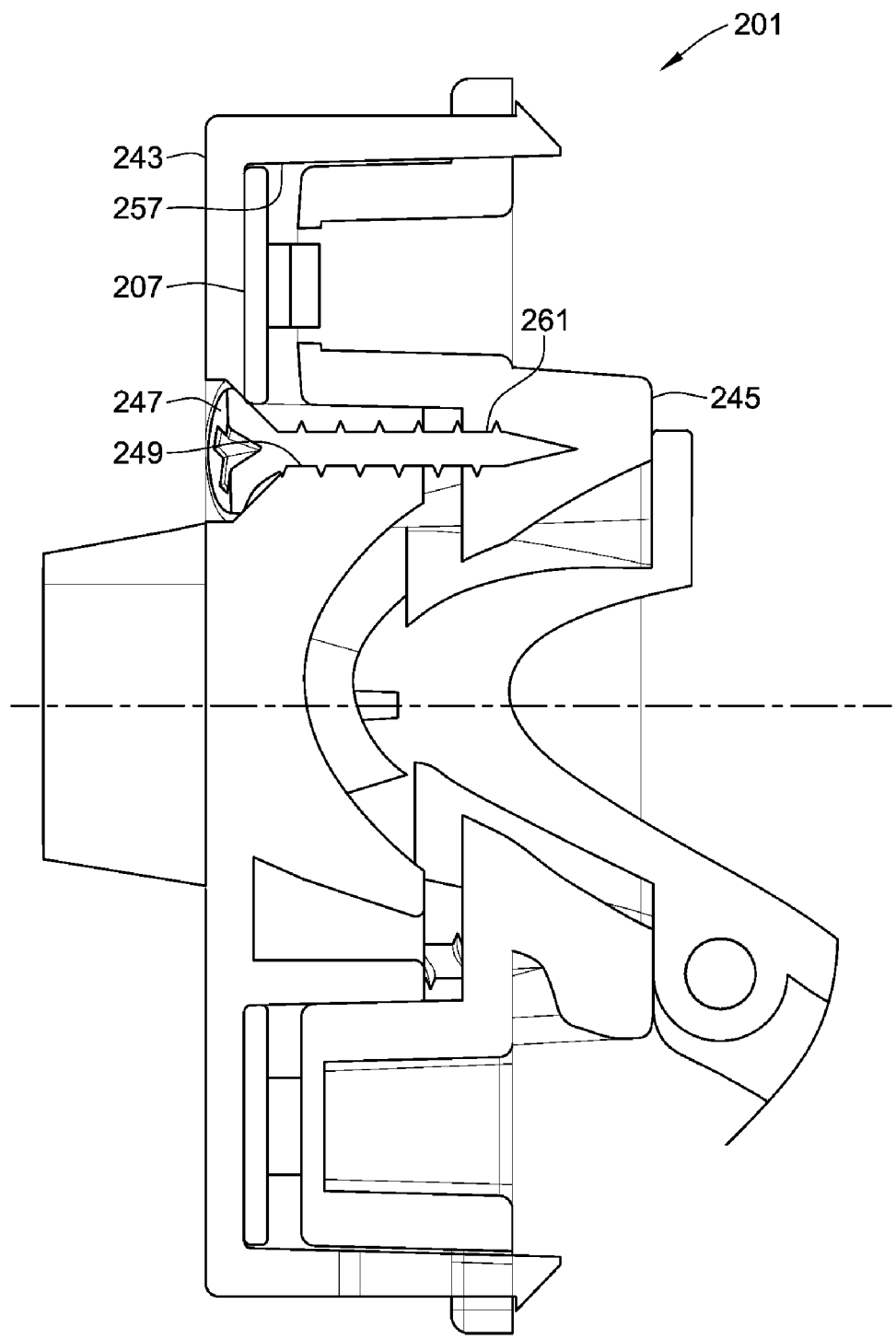
FIG. 12 is a cross-sectional view of the alternative embodiment taken generally along line 12-12 in FIG. 10.
Figure 13:
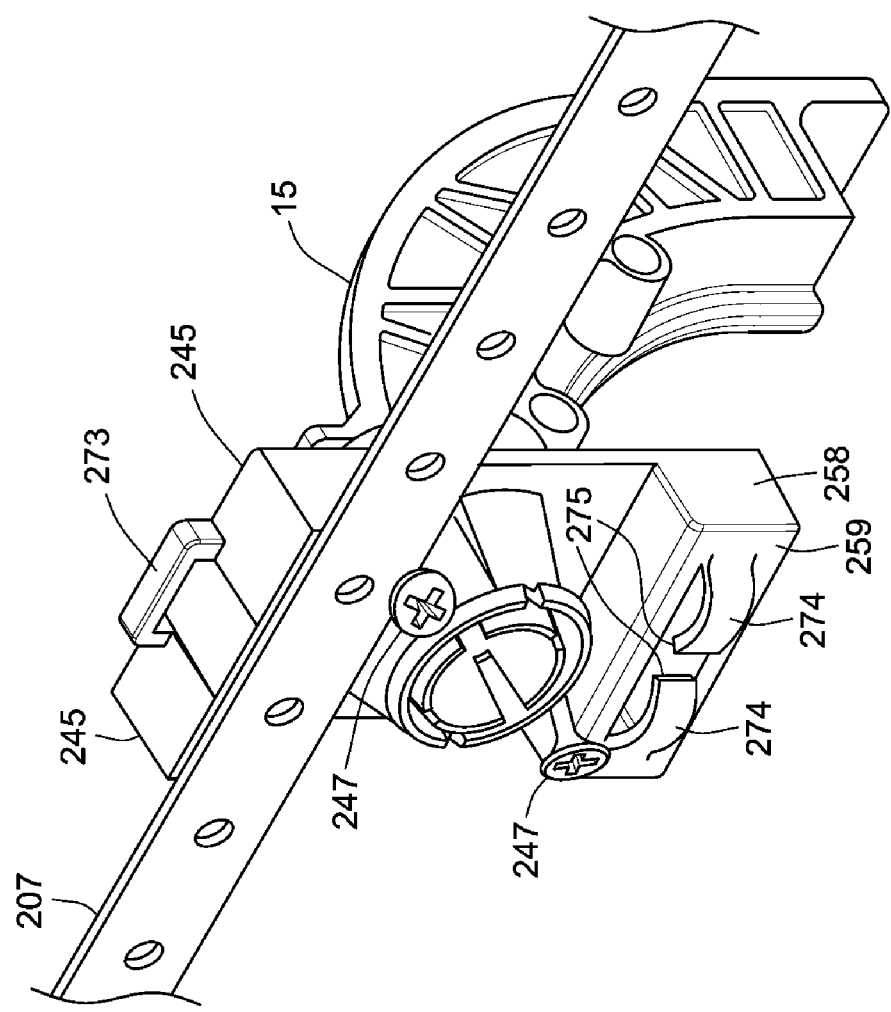
FIG. 13 is a perspective view of the alternative embodiment having the front clamping member of the hanger connector and one bracket removed to show internal detail.

Referring to FIGS. 12 and 13, at least one threaded fasteners 247 (two shown) extends through a respective fastener opening 259 in the front clamping member 243 and threadably engage a respective fastener receiver 261 in the rear clamping member 245. The fastener openings 259 are shown as being countersunk to receive flat-headed fasteners 247, with the countersunk portions of the openings 259 intersecting the grooves 257. The fastener openings 259 and respective fastener receivers 261 are set at an oblique angle relative to the grooves 257. When the fasteners 247 are installed and tightened, a portion of the head of each fastener 247 will engage and cut into the respective bracket 207 positioned in the respective groove 257 as shown in FIG. 12 and will act to help fix the connector 201 in a selected position along the brackets 207.

Figure 11:
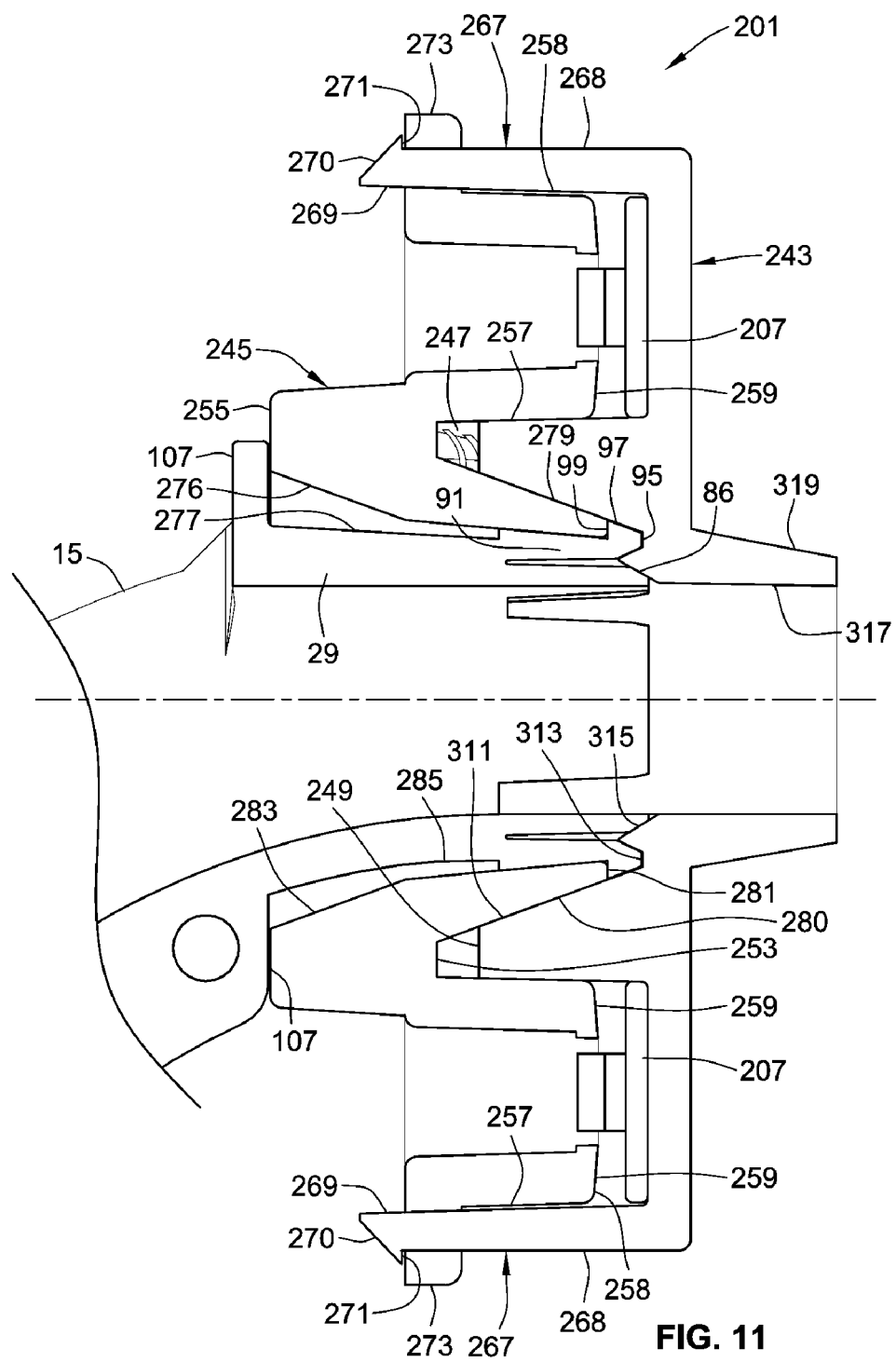
FIG. 11 is a cross-sectional view of the alternative embodiment taken generally along line 11-11 in FIG. 10.

As best seen in FIG. 11, the front clamping member 243 further includes a pair of retaining ears 267 which extend rearwardly from the front clamping member 243 proximate upper and lower edges thereof. The retaining ears 267 each include an arm 268 having a barb 269 formed at its distal end. Each barb 269 includes a tapered outer surface 270 and a inner surface 271 which is generally perpendicular to the arm 268. The retaining ears 267 are received in loops 273 formed on upper and lower edges of the rear clamping member 245. As the ears 267 pass through the loops 273, the arms 268 are first bent inwardly by the action of the outer surfaces 270 of the barbs 269 engaging the loops 273. After the barbs 269 pass through the loops 273, the arms 268 spring back into place. If the front clamping member 243 is then urged away from the rear clamping member 245, the inner surfaces 271 of the barbs 269 will engage the loops 273 to resist separation of the front clamping member 243 from the rear clamping member 245, even before the fasteners 247 are installed. The lengths of the arms 268 are selected to allow sliding of the connector 201 along the brackets 207 until the fasteners 247 are installed and tightened.

Referring to FIG. 13, the abutments 258 of the rear clamping member 245 may further include integrally formed leaf springs 274 which extend forwardly from the front faces 259 of the abutments 258 to biasingly engage the brackets 207 and resist uncontrolled sliding of the connector 201 along the brackets 207 before tightening of the fasteners 247. This feature is particularly useful during transit of assembled connectors 201 which are pre-installed on brackets 207 without the fasteners 247 tightened down. Without the added resistance provided by the leaf springs 274 the connectors 201 can easily slide off of the ends of the brackets 207. The lower abutment 258 is shown in FIG. 13 as having a pair of leaf springs 274 formed thereon. The upper abutment 258 (hidden by the bracket 207) is generally identical to the lower abutment 258 shown. Each leaf spring 274 includes a proximate end integrally formed with the respective abutment 258 proximate an outer edge of the rear clamping member 245, and extends inwardly to a distal end 275. Each leaf spring 274 bows forwardly from the forward face 259 of the respective abutment 258 in its relaxed state and is urged rearwardly from this relaxed position by contact with the respective bracket 207 when the connector 201 is assembled.

Referring again to FIG. 11, the rear clamping member 245 further includes a support receiver 276 including a support receiving opening 277 sized to receive the head 29 of the bend support 15. Coaxial with the support receiving opening 277 is a generally frusto-conical nose 279 which extends forwardly from the inner face 253 of the rear clamping member 245. As was described and shown above in reference to the nose 79 of the connector 1 above, the nose 279 is divided into a plurality of nose sections 280 which taper inwardly as they extend away from the inner face 253. Each nose section 280 terminates in an arcuate end wall 281. The support receiving opening 277 includes a first portion 283 which extends into the rear clamping member 245 from the outer face 255 thereof and a second portion 285 which extends from the first portion 283 to the end walls 281 of the nose sections 280. The first portion 283 tapers inwardly from a larger diameter at the outer face 255 to a smaller diameter at its juncture with the second portion 285. The second portion 285 also tapers inwardly from the juncture with the first portion 283 to the annular end wall 281, but at a much more gradual angle. For example, the first portion 283 may taper inwardly at an angle of approximately twenty degrees, while the second portion 285 may only taper inwardly at an angle of approximately five degrees.

The bend support 15 is attached to the rear clamping member 245 by pressing the head 29 of the bend support 15 into the support receiving opening 277 from the outer face 255. As the head 29 is pressed into the opening 77, the outer surfaces 97 of the barbs 95 engage the tapered walls of the first portion 283 and the taper acts to compress the flexible wall portions 91 inwardly. Continued force applied to the bend support 15 urges the flexible wall portions 91 into the second portion 285 of the opening 277, further compressing the flexible wall portions 91. As the barbs 95 bear against the nose sections 280, the nose sections 280 may flex outwardly somewhat.

Once the barbs 95 pass the end walls 281 of the nose sections 280, the flexible wall portions 91 spring outwardly such that the rear surfaces 99 of the barbs 95 will catch on the end walls 281 to prevent the head 29 from being withdrawn from the support receiving opening 277. The outwardly extending stop 107 of the bend support 15 engages the outer face 255 of the rear clamping member 245 to prevent the head 29 from being pushed completely through the support receiving opening 277.

The inner face 253 of the front clamping member 423 includes a tapered nose receiver 311 sized and shaped to receive the nose 279 of the rear clamping member 245. The tapered nose receiver 311 terminates in an annular wall 313. Extending rearwardly from the annular wall 313 is an annular wedge 315. The wedge 315 is spaced radially inwardly from the wall of the nose receiver 311 and positioned to engage the annular groove 86 in the head 29 of the bend support 15. A tubing receiver 317 extends through the front clamping member 243 radially inward of the annular wedge 313.

An outwardly extending collar 319 is formed on the outer face 251 of the front clamping member 243 in alignment with the tubing receiver 317. The collar 319 helps keep the tubing 3 straight as it extend through the tubing receiver 317.

In use, the bend support 15 is installed in the rear clamping member 245 by pushing the head 29 of the bend support 15 into the support receiving opening 277 of the rear clamping member 245 until the barbs 95 of the head 29 snap over the end walls 281 of the nose sections 280 of the rear clamping member 245. The connector 201 can then be installed on the two brackets 207 by positioning the brackets 207 in the grooves 257 of the front clamping member 243, aligning the abutments 258 of the rear clamping member 245 with the grooves 257, and pressing the retaining ears 267 of the front clamping member 343 into the respective loops 273 of the rear clamping member 245 to assemble the mounting block 217. As the front clamping member 243 and rear clamping member 245 are brought together, the nose 279 of the rear clamping member 245 is received in the nose receiver 311 of the front clamping member 243. Once the barbs 269 of the ears 267 snap past the loops 273, the connector 201 will be slidably mounted on the brackets 207. The leaf springs 274 provide enough pressure against the brackets 207 to impede the connector 201 from easily sliding off the brackets 207, but will still allow the connector 201 to be moved relative to the brackets 207. The bend support 15 remains rotatable relative to the mounting block 217. The fasteners 247 can be loosely installed at this point, or left out until later since the ears 267 will hold the connector 201 together. The preceding assembly steps may all be performed by the manufacturer of the connector 201 which may then be supplied to contractors pre-installed on the brackets 207.

The brackets 207 can then be mounted to the building members 9 and the connector 201 slid into its approximate desired position. Once the brackets 207 are mounted, the tubing 3 can be installed in the connector 201. The tubing 3 is initially slid directly into the head 69 of the bend support 15 from the back side thereof, through the opening 42 in the outer side of the bend support 15, until the tubing 3 extends through the head 69, and outwardly through the tubing receiver 317 in the front clamping member 243. Once the needed length of tubing 3 extends out of the tubing receiver 317, the tubing 3 can be bent downwardly into the passageway 27 and hooked under the barb 41 on the tail 37 of the bend support 15. The tubing 3 is thus positioned in the passageway 27 without having to thread the tubing 3 through the entire length of the bend support 15.

Once the tubing 3 is installed, the connector 201 is adjusted into its final position along the brackets 207. The connector 201 is then fixed to both the brackets 207 and the tubing 3 by installing and tightening the fasteners 247. As the fasteners 247 are tightened, the clamping members 243 and 245 are drawn against the brackets 207, thereby clamping the brackets 207 between the clamping members 243 and 245 and fixing the position of the connector 201 along the brackets 207. Simultaneously, the annular wedge 315 is forced into the annular groove 86 between the collet 101 and the outer wall 87 of the head 29 of the bend support 15. The action of the wedge 315 forces the fingers 103 of the collet 101 inwardly, thereby clamping against the tubing 3 and axially fixing the tubing 3 to the bend support 15. The action of the wedge 115 also forces the flexible wall portions 91 of the outer wall 87 outwardly against the nose sections 280, thereby fixing the bend support 15 to the mounting block 217 and preventing or resisting further rotation of the bend support 15 relative to the mounting block 217. The tapered nose receiver 311 of the front clamping member 243 engages the outer surfaces of the nose sections 280 and prevents them from flexing outwardly. The rotational fixing of the bend support 15 is further accomplished by the barbs 95 on the outer wall 87 being clamped between the end walls 281 of the nose sections 280 of the rear clamping member 245 and the annular wall 313 of the front clamping member 243.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed is:

1. A connector for connecting a piece of flexible tubing to a pair of brackets, said connector comprising:
   a) a bend support having an arcuate body with first and second ends, a passageway formed along said body between said first and second ends and a head formed proximate said first end, said head including a collet in alignment with said passageway and an outer wall concentric with and spaced apart from said collet, said outer wall having a radially outwardly extending barb formed thereon, said passageway and said collet sized to receive a piece of tubing;
   b) a front clamping member and a rear clamping member positionable on opposite sides of the brackets in abutting relationship therewith, said rear clamping member having a support receiver for receiving said head of said bend support, said radially outwardly extending barb on said head of said bend support engaging a portion of said rear clamping member adjacent said support receiver to retain said bend support in said support receiver, said front clamping member including a tubing receiver for passing the tubing therethrough and a wedge adjacent said tubing receiver; and
   c) at least one fastener interconnecting said front and rear clamping members and adapted for drawing said front and rear clamping members toward one another and against the brackets to fix the position of said connector relative to the brackets; wherein
   d) as said fastener draws said front and rear clamping members together with a piece of tubing extending through said collet and said tubing receiver, said wedge engages said collet to compress said collet against the tubing to fix the tubing relative to the connector.

2. The connector as in claim 1 wherein said wedge is an annular wedge concentric with said tubing receiver.

3. The connector as in claim 1 wherein said outer wall is divided into a plurality of flexible wall portions, said radially outwardly extending barb is formed on one of said flexible wall portions, and each of the other said flexible wall portions has a respective additional radially outwardly extending barb formed thereon, said barbs collectively engaging a portion of said rear clamping member adjacent said support receiver to retain said bend support in said support receiver.

4. The connector as in claim 1 wherein said head of said bend support is rotatably received in said support receiver of said rear clamping member.

5. The connector as in claim 4 wherein said wedge further engages said outer wall to urge said outer wall outwardly against said support receiver to rotatably fix said bend support relative to said rear clamping member.

6. The connector as in claim 1 wherein said clamping members each include a respective inner face, at least one of said inner faces including a pair of parallel grooves, each said groove for receiving a respective one of the brackets.

7. The connector as in claim 6 wherein each said groove is sized to receive an edge of the respective bracket.

8. The connector as in claim 6 wherein each said groove is sized to receive a face of the respective bracket.

9. The connector as in claim 8 wherein said grooves are formed in one of said clamping members and the other of said clamping members includes a pair of abutments in alignment with said grooves.

10. The connector as in claim 9 wherein each said abutment includes at least one leaf spring positioned to biasingly engage a bracket received in the respective groove.

11. The connector as in claim 1 wherein said arcuate body includes:
    a) an arcuate inner wall defining an inner side of said passageway;
    b) a first outer wall section forming a portion of said head and extending in spaced relation to a corresponding forward portion said inner wall; and
    c) a second outer wall section formed proximate said second end of said body and extending in spaced relation to a corresponding rearward portion of said inner wall spaced from said forward portion; wherein
    d) said first and second outer wall sections define an outer side of said passageway and wherein said outer side of said passageway is open between said first outer wall section and said second outer wall section.

12. The connector as in claim 11 wherein said arcuate body further includes a side wall defining a first lateral side of said passageway.

13. The connector as in claim 11 and further including a barb extending inwardly from said second outer wall section.

14. The connector as in claim 11 wherein said second outer wall section is part of a tail extending outwardly from said second end of said body.

15. The connector as in claim 1 and further including retaining means extending from one of said clamping members and engaging the other of said clamping members to retain said clamping members together in spaced relation such that the brackets are slidably receivable between said clamping members until said at least one fastener is tightened to draw said clamping members together.

16. The connector as in claim 15 wherein said retaining means includes at least one retaining pin extending from an inner face of one of said clamping members and receivable in a pin receiver in the other of said clamping members, said retaining pin including a flexible flange engageable with said pin receiver.

17. The connector as in claim 15 wherein said retaining means is a retaining ear extending from one of said clamping members and receivable in a loop on the other of said clamping members, said retaining ear including a barb engageable with said loop.

18. A connector for connecting a piece of flexible tubing to a pair of brackets, said connector comprising:
   a) a bend support having an arcuate body with first and second ends, a passageway formed along said body between said first and second ends and a head formed proximate said first end, said head including a collet in alignment with said passageway and an outer wall coaxial with said collet and separated from said collet by an annular groove, said passageway and said collet sized to receive a piece of tubing;
   b) a front clamping member and a rear clamping member positionable on opposite sides of the brackets in abutting relationship therewith, said rear clamping member having a support receiver for rotatably receiving said head of said bend support, said front clamping member including a tubing receiver for passing the tubing therethrough and an annular wedge coaxial with said tubing receiver; and
   c) at least one fastener interconnecting said front and rear clamping members and adapted for drawing said front and rear clamping members toward one another and against the brackets to fix the position of said connector relative to the brackets; wherein
   d) as said fastener draws said front and rear clamping members together with a piece of tubing extending through said collet and said tubing receiver, said annular wedge engages said annular groove to simultaneously compress said collet inwardly against the tubing to fix the tubing relative to the connector and urges said outer wall outwardly against said support receiver to rotationally fix said bend support relative to said rear clamping member.

19. The connector as in claim 18 wherein said outer wall is divided into a plurality of flexible wall portions, each said flexible wall portion having a radially outwardly extending barb formed thereon, said barbs engaging a portion of said rear clamping member adjacent said support receiver to retain said head of said bend support in said support receiver.

20. The connector as in claim 18 wherein each of said front and rear clamping members includes an inner face, at least one of said inner faces including a pair of grooves, each said groove for receiving a respective one of said brackets.

21. The connector as in claim 18 and further including retaining means extending from one of said clamping members and engaging the other of said clamping members to retain said clamping members together in spaced relation such that the brackets are slidably receivable between said clamping members until said at least one fastener is tightened to draw said clamping members together.

* * * * *